United States Patent
Benton et al.

(10) Patent No.: US 8,881,919 B2
(45) Date of Patent: Nov. 11, 2014

(54) SYSTEM FOR MEASURING LENGTH OF A BEAM EXTENSION AND DETECTING SUPPORT

(75) Inventors: John F. Benton, Smithsburg, MD (US); John R. Rudy, Greencastle, PA (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 583 days.

(21) Appl. No.: 13/100,758

(22) Filed: May 4, 2011

(65) Prior Publication Data

US 2012/0279938 A1    Nov. 8, 2012

(51) Int. Cl.
| | |
|---|---|
| *B66C 13/18* | (2006.01) |
| *G01B 11/14* | (2006.01) |
| *G01B 11/02* | (2006.01) |
| *B66C 23/78* | (2006.01) |

(52) U.S. Cl.
CPC ............. *G01B 11/14* (2013.01); *B66C 13/18* (2013.01); *G01B 11/02* (2013.01); *B66C 23/78* (2013.01)
USPC .......................................... 212/277; 212/302

(58) Field of Classification Search
USPC ................ 212/276–277; 324/207.24, 207.21, 324/207.26, 207.11, 245, 247, 261; 340/685
See application file for complete search history.

(56) References Cited

U.S. PATENT DOCUMENTS 5,580,095 A * 12/1996 Fukumoto ................. 280/766.1
7,221,151 B2   5/2007 Schroeder et al.

FOREIGN PATENT DOCUMENTS

| JP | 7032299 Y2 | 7/1995 | |
|---|---|---|---|
| JP | 09-118496 A | 5/1997 | |
| JP | 09156478 A * | 6/1997 | ............... B60S 9/12 |
| JP | 2005126019 A * | 5/2005 | ............... B60S 9/12 |
| JP | 2007-283864 A | 11/2007 | |
| JP | 2011184171 A * | 9/2011 | |

OTHER PUBLICATIONS

Tadano, a company that makes truck mounted cranes, has used a string potentiometer to measure the amount of extension on beams on outriggers since before May 4, 2010.

* cited by examiner

*Primary Examiner* — Sang Kim
*Assistant Examiner* — Juan Campos, Jr.
(74) *Attorney, Agent, or Firm* — Brinks Gilson & Lione; Steven P. Shurtz

(57) ABSTRACT

An extendable beam measurement system includes a support; a beam mounted on the support and movable with respect to the support along an axis of movement; a series of sensory points mounted along either the beam or the support in an orientation that is not parallel to the axis of movement of the beam; and a sensor attached to the other of the beam or the support in a direction that crosses the series of sensory points at different positions during movement of the beam along said axis. The sensor generates a first signal varying as the beam is moved along the axis to thereby provide a signal indicating the position of the beam with respect to the support. The system is useful on an outrigger for supporting a crane. Optionally the system can provide a second signal indicative of whether a jack on the outrigger is contacting a support surface and supporting the crane. Alternatively, the system used to optionally generate the second signal can be used by itself to indicate whether a jack is supporting the crane, even if the beam extension is not measured.

17 Claims, 9 Drawing Sheets

SYSTEM FOR MEASURING LENGTH OF A BEAM EXTENSION AND DETECTING SUPPORT

BACKGROUND

1. Field of the Invention

The invention is directed to a system that will determine the relative position of a beam mounted on the support and movable with respect to the support along an axis of movement, and additionally, or alternatively, will detect whether the beam is supported on the ground. In particular, the invention is directed to a system for use in connection with an apparatus, such as a crane, having telescoping outrigger beams and jacks for stabilizing the apparatus. In accordance with the invention, a system is provided that generates a first signal varying as the beam is moved along said axis to thereby provide a signal indicating the position of the beam with respect to the support. The system may further detect whether the outrigger jacks are lowered and supporting the crane.

2. Background of the Invention

Heavy construction equipment, such as a mobile crane, typically includes a carrier unit in the form of a transport chassis and a superstructure unit having an extendable boom. The superstructure unit is typically rotatable upon the carrier unit. In transport the crane is supported by the carrier unit on its axles and tires.

When used for lifting operations the crane should normally be stabilized to a greater degree than is possible while resting on the tires and axles of the transport chassis. In order to provide stability and support of the crane during lifting operations, it is well known to provide the carrier unit with an outrigger system. An outrigger system will normally include at least two (often four or more) telescoping outrigger beams with inverted jacks for supporting the crane when the crane is located in a position at which it will perform lifting tasks.

Utilizing the extensible beams, the jacks may be positioned at locations at which they will provide a stabilizing base for the crane. The inverted jacks are lowered into contact with the ground in order to support and stabilize the carrier unit and the superstructure unit. The jacks may be lowered sufficiently, if desired, so as to support the crane in a manner such that the tires are elevated above the ground.

Historically, a crane operator would determine the degree to which the outrigger beams should be extended to properly stabilize a crane, and visually inspect to determine if the jacks were lowered to a degree such that they were supporting and stabilizing the crane. It is useful, however, to be able to monitor the positions and conditions of the outrigger elements automatically and to provide an indication to the operator of the arrangement and condition of the outriggers. It would also be beneficial to be able to monitor the position and condition of the outriggers and to then provide appropriate signals of those conditions to a crane monitoring and control system.

In particular, it is desirable to be able to measure the length of an outrigger beam as it is extended and to provide signals indicative of the extended length and, thus, the location of the jacks to assist in operation of the crane. Additionally, it is desirable to be able to monitor and determine whether the inverted jacks are actually extended to a point where they are actually supporting the crane, and to provide appropriate signals to assist in operation of the crane.

BRIEF SUMMARY

The present invention provides an apparatus and method for achieving the above-described results. Particularly, the invention provides a system and method for monitoring and measuring the degree to which an extensible outrigger beam is actually extended, at least at certain extension conditions, and preferably at any amount of extension. The preferred embodiment of the invention also provides a system that monitors whether the jacks associated with the outrigger system are in fact in contact with the ground and stabilizing/supporting the crane.

In a first aspect, the invention includes an extendable beam measurement system comprising a support; a beam mounted on the support and movable with respect to the support along an axis of movement; a series of sensory points mounted along either the beam or the support in an orientation that is not parallel to the axis of movement of the beam; and a sensor attached to the other of the beam or the support in a direction that crosses the series of sensory points at different positions during movement of the beam along said axis; said sensor generating a first signal varying as the beam is moved along said axis to thereby provide a signal indicating the position of the beam with respect to the support.

In a second aspect, the invention involves a method for determining a position of a beam with respect to a support for the beam, said beam being moveable along an axis of movement with respect to the support, the method comprising: attaching a series of sensory points to either the beam or the support in an orientation that is not parallel to the axis of movement; associating a sensor with the other of the beam or the support in a direction that crosses the series of sensory points at different positions during movement of the beam along said axis; detecting with said sensor the position of said series of sensory points as the beam moves along said axis; and providing a first signal indicating the relative position of the beam with respect to the support as detected by the sensor.

In a third aspect, the invention includes a crane comprising at least one outrigger and a system for determining a degree of extension of the outrigger with respect to the crane, the outrigger comprising a beam that is moveable along an axis of movement with respect to an outrigger support, the system comprising: a series of sensory points attached to either the beam or the support in an orientation that is not parallel to the axis of movement; and a sensor attached to the other of the beam or the support in a direction that crosses the series of sensory points at different positions during movement of the beam along said axis. The sensor detects the position of said series of sensory points as the beam moves along said axis. The sensor provides a first signal indicating the relative position of the beam with respect to the support as detected by the sensor.

In a fourth aspect, the invention involves a method of operating a crane comprising at least one outrigger comprising a beam that is moveable along an axis of movement with respect to an outrigger support, the method comprising: a) providing a series of sensory points attached to either the beam or the support in an orientation that is not parallel to the axis of movement; b) providing a sensor attached to the other of the beam or the support in a direction that crosses the series of sensory points at different positions during movement of the beam along said axis; c) detecting the position of said series of sensory points with respect to the sensor as the beam moves along said axis; and d) providing a first signal indicating the relative position of the beam with respect to the support as detected by the sensor.

In a fifth aspect, the invention includes a crane comprising at least one outrigger with a jack mounted thereon, and a system for determining whether the jack is extended and engaging the ground so as to support the crane when the outrigger is in a desired operational position, the outrigger comprising a beam that is moveable along an axis of movement with respect to an outrigger support, the beam having the ability to move up and down a small degree with respect to the support as the weight of the crane is transferred to or from the jack, the system comprising: at least one sensory point attached to either the beam or the support; and a sensor attached to the other of the beam or the support in a position such that it will be able to sense the position of the at least one sensory point when the outrigger beam is in the desired operational position; the sensor detecting the position of said sensory point as the beam moves up or down with respect to the support and thus provides a signal for indicating whether the jack is providing support for the crane.

In a sixth aspect, the invention includes a method of operating a crane comprising at least one outrigger comprising a beam that is moveable along an axis of movement with respect to an outrigger support, the method comprising: a) providing at least one sensory point attached to either the beam or the support; b) providing a sensor attached to the other of the beam or the support in a position such that it will be able to sense the position of the at least one sensory point when the outrigger beam is in the desired operational position; c) detecting the position of said at least one sensory point with respect to the sensor as the beam moves up and down with respect to the support as the weight of the crane is transferred to or from the jack; and d) providing a signal indicating whether the jack is providing support for the crane.

The components of the preferred system comprise virtually no moving parts, are extremely durable and reliable, and are easily resistant to the outdoor elements and conditions encountered by a crane or similar apparatus.

These and other advantages of the invention, as well as the invention itself, are described in detail with reference to the drawings.

DETAILED DESCRIPTION OF THE DRAWINGS AND THE PRESENTLY PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Several terms used in the specification and claims have a meaning defined as follows. The phrase "series of sensory points" means a plurality of sensory markers that are arranged in a geometry that can be used to differentiate one point from another. The points in the series may be connected together to make one continuous strip, such as a strip of magnetic material, or they may be individual markers separated from one another. The series of points need not all fall on a straight line. In fact, the points may not even represent any sort of geometric curve. If a computer is programmed so that when the sensor provides a distinct output as it senses each different sensory point, then the points are in a "series" as that term is used herein.

The term "small degree" in the phrase "the beam having the ability to move up and down a small degree with respect to the support as the weight of the crane is transferred to or from the jack" means the degree of movement that is found acceptable in commercially available cranes with outriggers. For example, for any given outrigger beam mounted in a box support on a commercially available crane, the degree to which the beam can move up and down inside of the box on the product represents a small degree of movement.

The preferred embodiment of the present invention provides a non-mechanical measuring system, i.e., no moving parts, which can both measure the extension of a telescoping beam and determine if the inverted jack is supporting the crane. Examples of the preferred embodiments will be described with reference to a mobile crane having a superstructure unit and a carrier unit.

Figure 15:
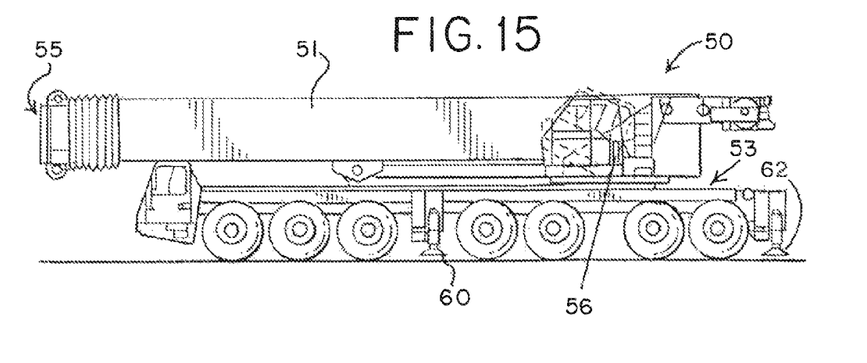
FIG. 15 is a side view of an exemplary mobile crane having a carrier unit and stabilizing outriggers.

Referring to FIG. 15, an exemplary mobile crane 50 comprises a superstructure 55 disposed on a transportable chassis or carrier unit 53. The superstructure unit may include any of a variety of types of extendable booms (e.g., telescopic boom 51). The carrier unit is provided with tires that enable the mobile crane to maneuver over land to a desired location for lifting tasks.

However, once the crane is positioned at a location to perform lifting tasks, as tires often do not provide adequate support for lifting loads, an outrigger system is provided for stabilizing the crane during lifting operations. The outrigger system is most often provided as part of the carrier unit. In the example illustrated in FIG. 15 the crane comprises a front and rear set of outriggers identified as 60 and 62, respectively. In some cases, outrigger beams can be transported separately from the carrier unit and attached to the crane at the job site. Appropriate controls for the outriggers are normally provided on the carrier unit for operation by an individual standing near the crane, in the operator's cab, or both.

Figure 1:
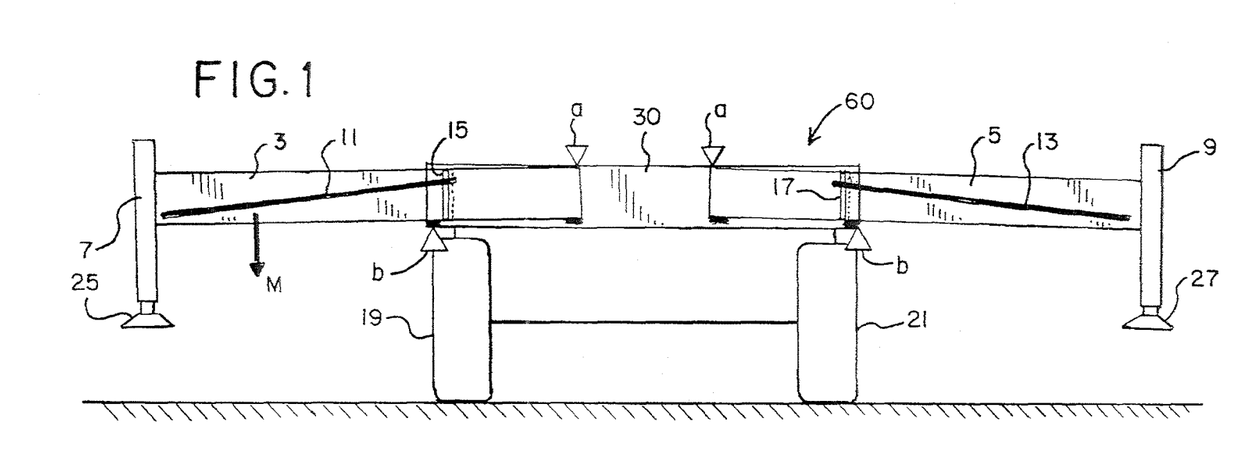
FIG. 1 is a schematic illustration of an outrigger system with beams extended and jacks in raised position.
Figure 2:
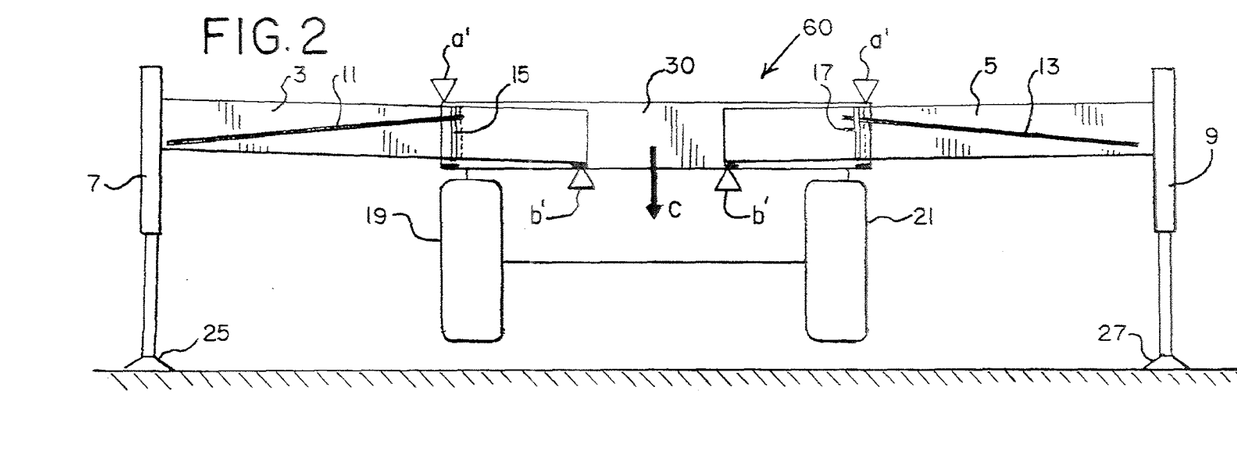
FIG. 2 is a view similar to FIG. 1 of an outrigger system with jacks in a lowered position.

An exemplary embodiment of an outrigger system 60 is shown in FIGS. 1 and 2, viewed from a point along the longitudinal axis of the transport chassis. Although the crane may include two pairs of outriggers 60, 62 for the front and rear of the crane, respectively, FIGS. 1 and 2 each show only the pair of outrigger beams shown at 60 in FIG. 15. The details of outrigger portion 62 are substantially similar.

The outrigger portion 60 includes two outrigger beams 3, 5. Each outrigger beam is mounted telescopically within an outrigger box 30. The outrigger boxes are, in turn, attached to the frame of the carrier unit (not shown in FIGS. 1-2). Thus the beams are each mounted on a support and movable with respect to the support along an axis of movement. While not shown in FIG. 1, because the lengths of beams 3 and 5 are such that, in order to retract each beam fully, the outrigger boxes 30 are the full width of the carrier unit, the boxes 30 are positioned side-by-side in different planes, as is well known in the art. Since the two separate boxes 30 overlap one another and cannot be separately seen from the perspective of FIG. 1, only one outrigger box 30 is depicted in the Figures. Of course there may be some embodiments where both outriggers 3 and 5 are contained within the same box.

As shown in FIG. 1, a first outrigger 3, extending from outrigger box 30, has mounted thereon a first inverted jack 7. At the lower end of the jack is an outrigger pad 25. In a similar manner, a second telescoping outrigger beam 5 extends from outrigger box 30. Mounted on the end of beam 5 is a second inverted jack 9 having an outrigger pad 27.

During transport of the crane, the beams 3 and 5 would be fully retracted into box 30 such that jacks 7 and 9 are positioned against the transport chassis. As shown in FIG. 1, for lifting operations the telescoping beams 3 and 5 can be extended away from the chassis to form a stabilizing base substantially wider than the transport chassis. As shown in FIG. 2, the inverted jacks 7 and 9 can then be lowered in order to stabilize the crane. The jacks can be lowered sufficiently such that the jacks lift the tires 19 and 21 off of the ground whereby the weight of the crane is borne by the jacks alone.

In accordance with the present preferred embodiment, a measurement system is provided that measures the outrigger beam extension length. The system in accordance with the preferred embodiment can also determine whether the inverted jacks are in a position to support the crane.

The measurement system of the preferred embodiment is based on a magnetic series of sensory points that operates in conjunction with a magnetic sensor. As shown in FIG. 1, the first telescoping beam 3 is provided with a first magnetic strip 11 that provides the series of sensory points. In this case the series is a continuous and straight line. An associated first magnetic sensor 15 is provided in association with the outrigger box 30 that provides the support for the beam. The second telescoping beam 5 is similarly provided with a second magnetic strip 13 and a second magnetic sensor 17 is associated with the outrigger box 30.

The magnetic strips 11, 13 are arranged in relation to the beams 3, 5 in a manner that results in a change in the position of the magnetic strip in relation to the associated sensor as the beam is extended or retracted. In the illustrated embodiment, the strips 11, 13 are angled (set at an angle or diagonal with respect to the longitudinal axis of the beam). Each magnetic sensor 15, 17 is positioned in a manner so that it may detect the relative change of position of the associated magnetic strip as the beam is extended or retracted with respect to the box. In the illustrated embodiment, each sensor 15, 17 is mounted on the outrigger box 30 in a vertical orientation.

The magnetic sensors 15, 17 are devices that can detect the position where the magnetic strip 11 and 13, respectively, is adjacent thereto, and output a signal indicative of that position. Thus, each sensor 15, 17 is a measurement sensor, and preferably has a linear scale. Generally, the sensor for detecting the degree to which an outrigger beam is extended or retracted, in accordance with the preferred embodiment, can be positioned approximately perpendicular to the axis along which the beam is extended and retracted. In this way the sensor generates a first signal varying as the beam is moved along the movement axis, and thereby provides a signal indicating the position of the beam with respect to the support. It need not be precisely perpendicular, however, as long as it is positioned so that it can detect a change in the relative position of the magnetic strip on the beam in relation to the sensor. Other positions of the sensor may be considered in order to influence the resolution of the sensor in one direction or to allow for interference from other components.

An example of a sensor suitable to serve as the magnetic sensor 15, 17 is a product known as "MagnetoPot." This is a type of magnetic potentiometer. However, the magnetic sensor of the present preferred embodiment can be any of a variety of types of measurement sensor that can detect the position of a magnet, magnetic field, or other signal derived from a magnetic field.

In the illustrated embodiments, each magnetic strip 11, 13 is attached to an outrigger beam and is set at an angle with respect to the longitudinal axis of the beam. The magnetic strip should extend along the beam from the vicinity of the end of the beam having the inverted jack to encompass at least the entire length of the beam that will be extended outwardly from the box 30 when the beam is in a full extended position. The angle of the magnetic strip with respect to the beam can be such that the end located in the vicinity of the jack is toward the lower or upper surface of the beam, while the opposite end of the strip is oppositely positioned toward the upper or lower surface of the beam. It is not necessary that either end of the magnetic strip be located such that an end is coincident with the top or bottom surface of the beam. The magnetic sensor should be located along the beam such that the position of the magnetic strip remains within the end points of the range of measurement of the associated magnetic sensor throughout the entire range of motion of the telescoping beam. An exemplary angular arrangement of the magnetic strips 11, 13 and associated magnetic sensors 15, 17 can be seen in FIGS. 1 and 2.

Figure 3:
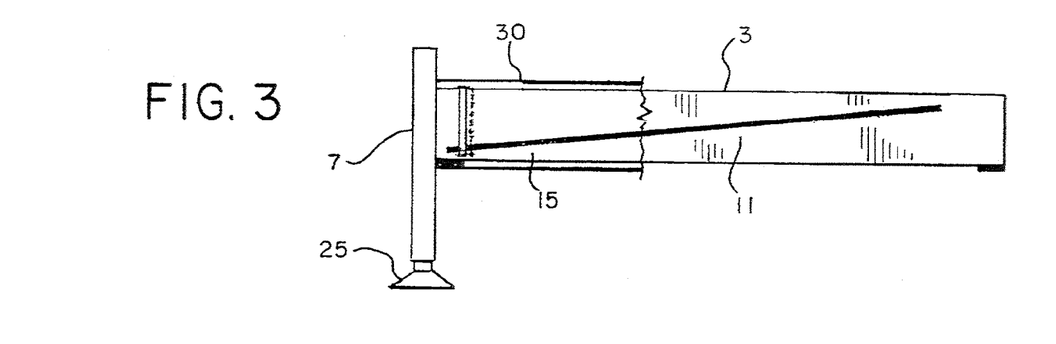
FIG. 3 is a diagram illustrating a beam in a retracted position.
Figure 4:
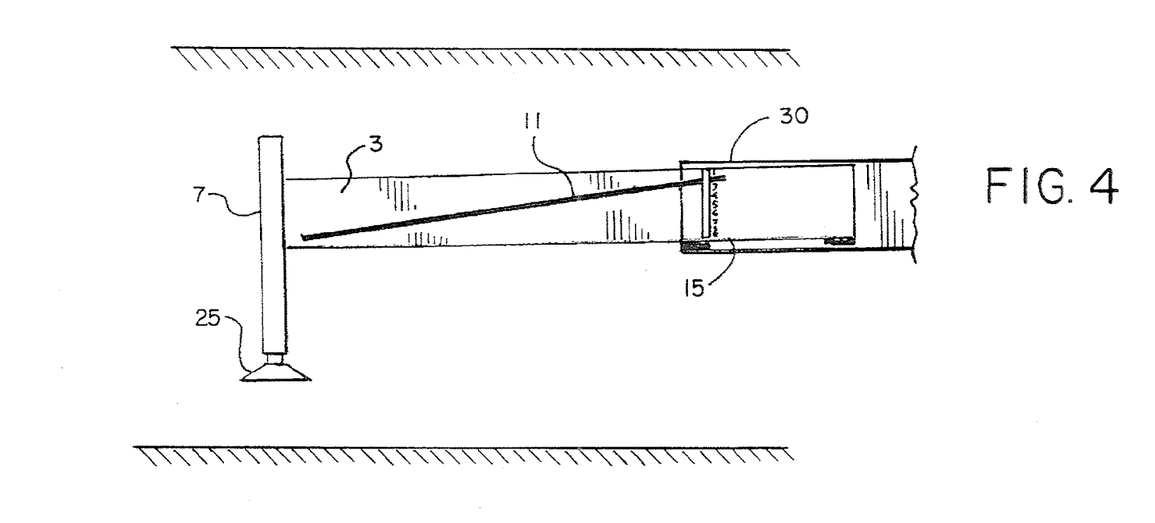
FIG. 4 is a diagram illustrating a beam in an extended position.

As a beam is extended from or retracted into the outrigger box, the magnetic strip will be at a different position in relation to the associated sensor due to the angled mounting of the magnetic strip on the beam. For example, in the embodiment shown in FIG. 3, when the beam is in a retracted position, the sensor 15 will detect a magnetic presence due to the magnetic field emitted by the strip 11 at or near the lower-most point of the magnetic sensor. As shown in FIG. 4, when the beam is fully extended, the magnetic sensor 15 will detect a magnetic presence at or near the upper-most point of the sensor. Because the magnetic strip extends along the beam for a length sufficient to encompass the motion of the beam to its fully extended position, the magnetic sensor can detect all positions along the range of motion of the outrigger beam.

As noted above, the magnetic strip can be mounted in either diagonal direction along the beam. In FIGS. 3 and 4 the strip 11 extends from a lower position adjacent the jack to an upper position nearer the inner end of the beam. As a result, when the beam is retracted the sensor detects the magnetic strip near the lower part of its detecting range and at the upper part of its detecting range when the beam is extended. In an alternative arrangement, the strip 11 could be angled in the opposite direction and, when the beam is in a retracted position, the sensor will detect a magnetic presence at or near the upper-most point of the magnetic sensor, and when the beam is fully extended, the magnetic sensor will detect a magnetic presence at or near the lower most point of the sensor.

Alternately the strips 11 and 13 could be attached to the boxes 30 and the sensors 15 and 17 could be attached to the outrigger beams 3 and 5 near their inside ends. Also, the strips and sensors do not need to be straight, or mounted in the positions shown. The strip just needs to be mounted along either the beam or the support in an orientation that is not parallel to the axis of movement of the beam; and the sensor needs to be attached to the other of the beam or the support (meaning that if the strip is attached to the beam, the sensor will be attached to the support, and if the strip is attached to the support, the sensor will be attached to the beam) in a direction that crosses the strip at different positions during movement of the beam along the axis of movement. The strip could be mounted (on either the beam or the box) so that it has a substantially vertical orientation, with the sensor mounted (to the other of the beam or the box) with a diagonal mounting. Even if it is mounted vertically, the strip is still mounted in an orientation that is not parallel to the axis of movement of the beam.

The series of sensory points need not be a continuous strip. For example, if the crane operator only needs to know whether the outrigger is in one of three positions (completely retracted, completely extended and at specified midpoint of extension), then the series of sensory points could be three points of magnetic material, positioned so as to be picked up by the sensor when the beam is at one of the three positions. Thus the sensory points could be at a high position on the inside end of the beam, a low position on the outside end of the beam, and a midpoint height-wise at a midpoint length-wise on the beam. The series of sensory points will thus be oriented in a manner that the sensor will produce a different signal when it senses one of the three different points.

As thus far described, the arrangement of the magnetic sensor and magnetic strip are utilized to measure the length of extension of the beam. It is also useful, however, to be able to detect whether the jacks associated with the outrigger beams are lowered into a position supporting the crane. The present preferred embodiment provides such a capability.

While the beam 3 slides out of and into the outrigger box 30 in a primarily linear fashion, it must be realized that during full extension beam movement, the movement is not precisely linear.

When the outrigger beam is fully retracted into the box 30, the beam 3 or 5 will lie in a position wherein its longitudinal axis is virtually perfectly parallel to the longitudinal axis of the outrigger box 30. However, in order for the outrigger beams 3, 5 to slide properly within box 30, there must be a gap of some dimension between the outer surfaces of the outrigger beams and the inner surfaces of the outrigger box. The gap permits a small degree of "play," that is, movement of the outrigger beams in relation to the box, particularly as the beams are extended and as the jacks are lowered or raised, thereby imposing substantial forces transverse to the beams.

As can be seen in FIG. 1, when a beam is extended and is cantilevered from the box 30, and the jacks are in a raised position, the force M of the mass of the beam causes the beam to sag slightly as it is extended. The force M of the beam's mass is counter-acted, and the beam is supported primarily by counter forces acting between the beam and box 30 at locations identified by the triangle symbols a and b.

As illustrated in FIG. 2, when the inverted jacks are in the lowered position and the outriggers are supporting the crane with tires elevated, the mass of the crane C is supported by the outriggers and the location of forces a, b between the beams and the outrigger box is reversed as shown at a' and b'. This movement in the beam as the jacks are raised or lowered will be reflected in a change in the point where the magnetic strip crosses the magnetic sensor, even if the beam is not extended or retracted. The measurement system of the present preferred embodiment utilizes this phenomenon to provide not only a measurement of the length of the telescoping beam, but also to detect if the jacks are supporting the crane. Thus with the preferred embodiment, a second signal is provided to indicate a relative change in position of the beam with respect to the support as a result of a force acting on the beam in a direction that crosses the axis of movement.

Figure 5:
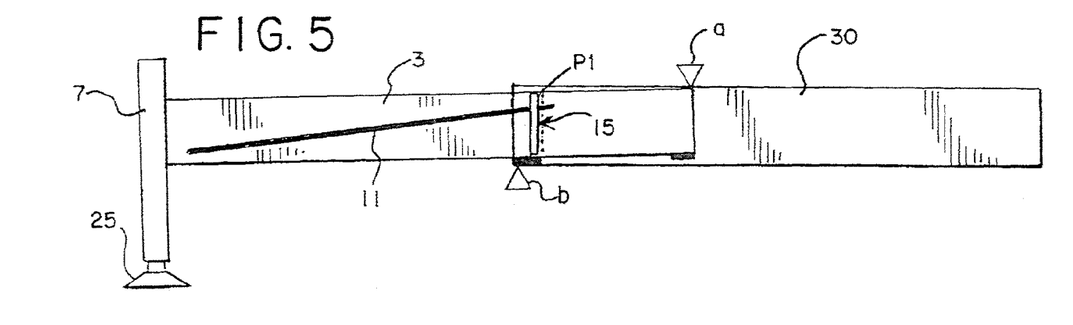
FIG. 5 diagrammatically shows the location of forces resulting from a beam in the extended position and the jack in the raised position.

This aspect of the preferred embodiment is further explained with reference to FIGS. 5 and 6. As seen in FIG. 5, when the beam 3 is cantilevered freely from the box 30 and is supported primarily by forces acting at points a and b, magnetic strip 11 crosses sensor 15 at a first point P1. Magnetic sensor 15 can provide, at this point in time, a signal to a control system for the crane indicating the degree to which the beam is extended based on the reading at point P1.

Figure 6:
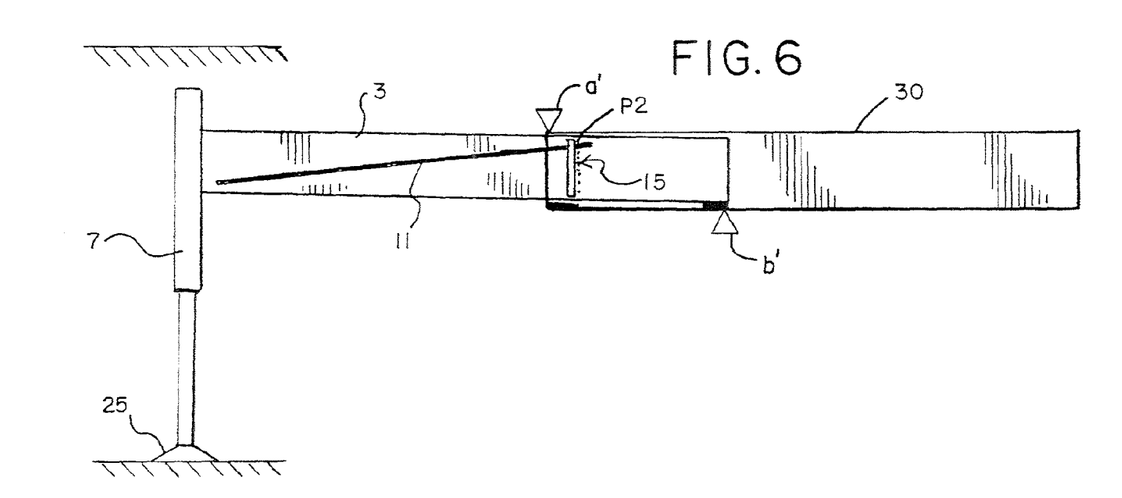
FIG. 6 diagrammatically shows the location of forces resulting from a beam in the extended position and the jack in a lowered position.

Assuming that the outrigger beam remains in that extended position, and the jack 7 is lowered to the point where it is supporting the crane, as shown in FIG. 6, the orientation of beam 3 will shift slightly with respect to box 30, as described above. As a result, the point at which the magnetic strip 11 crosses the sensor 15 will change slightly to a location P2 higher along the sensor 15. A second reading can be taken from sensor 15 at that time. The differences in, the readings from points P1 and P2 provide an indication that the crane is then supported on the jacks and outriggers, not on the tires of the transport chassis. Thus the sensor provides a second signal indicating that the jack has engaged the supporting surface and is supporting the crane.

As a result, in accordance with the preferred embodiment, it is unnecessary for an operator to determine visually the amount that the jack has been lowered or if it has been lowered sufficiently to support the crane. A change in the reading of the magnetic sensor by a small amount, resulting from the shift of the beam with respect to the outrigger box, is sufficient to provide a signal as an indication that the jack is supporting the crane. Such signal can be provided to an automatic system for monitoring and/or controlling operation of the crane.

Figure 7:
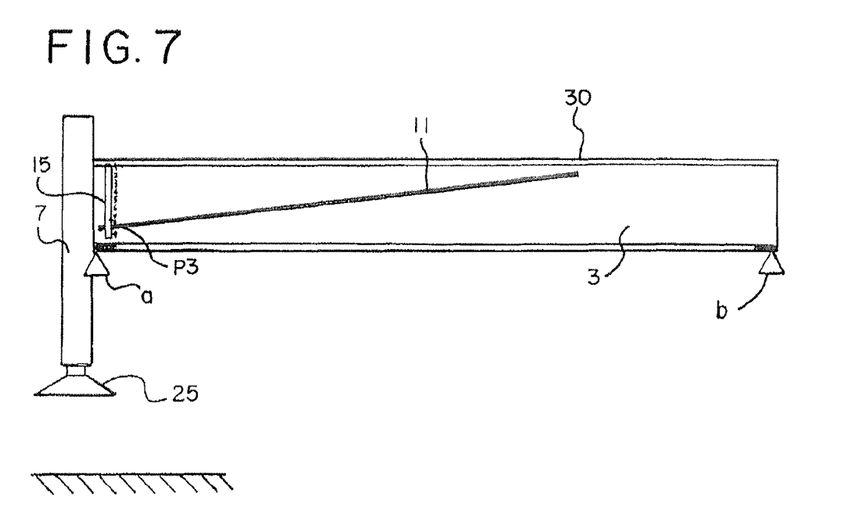
FIG. 7 diagrammatically shows the location of forces resulting from a beam in the retracted position and the jack in a raised position.
Figure 8:
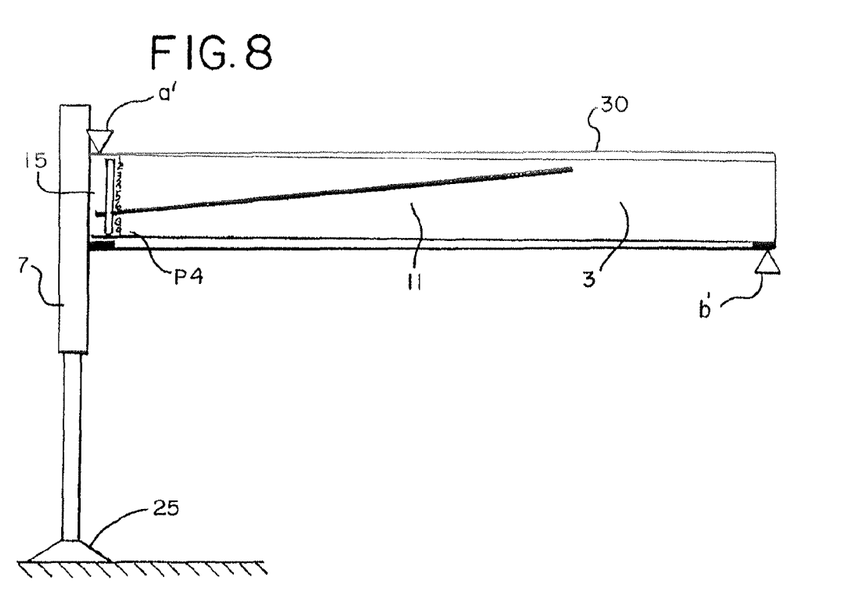
FIG. 8 diagrammatically shows the location of forces resulting from a beam in the retracted position and the jack in the lowered position.

FIGS. 7 and 8 illustrate how the same measurements can be made in the case that the outrigger beam is fully retracted. In FIG. 7 the beam 3 is fully retracted into the box 30 and the crane is supported on its tires and axles. In this configuration beam 3 is simply "resting" within box 30 and supported substantially evenly such as by forces at points a and b. In this state, magnetic strip 11 crosses sensor 15 at point P3 relatively near the lower portion of sensor 15. This indicates that the beam is fully retracted.

If the beam is not extended outwardly from box 30, but the jack 7 is lowered such that the jack supports the crane, the forces between the beam 3 and the outrigger box 30 are changed such that the primary forces there between can be represented as acting at points a' and b' as illustrated in FIG. 8. As a result the magnetic strip 11 crosses the magnetic sensor 15 at a higher position P4 slightly higher up on the sensor 15, which changes the reading from the sensor. The change in reading is an indication that the jacks are now supporting the crane and the crane is thus stabilized. Thus, in the retracted position as well as in an extended position, the magnetic strip and sensor of the preferred embodiment can provide signals indicating both the position of the outrigger beam and whether the jack is in the lowered position and supporting the crane.

Figures 12, 12A:
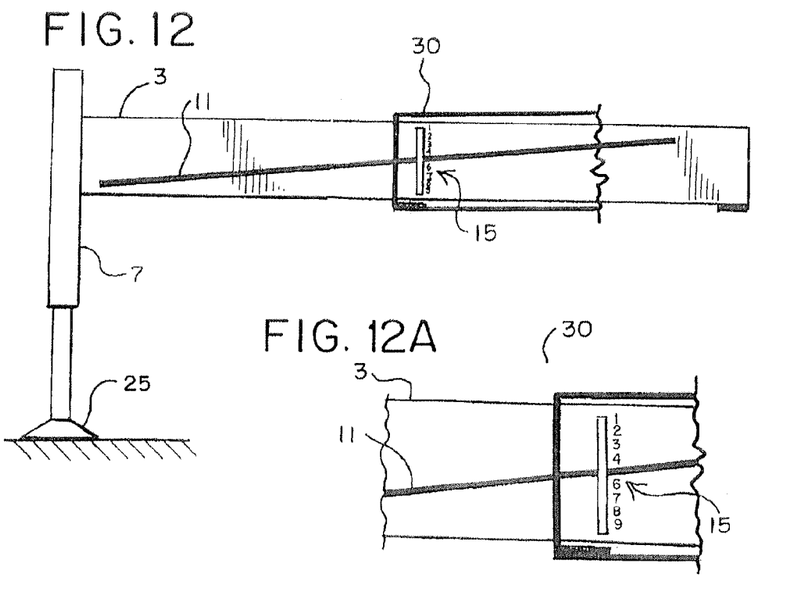
Figure 13:
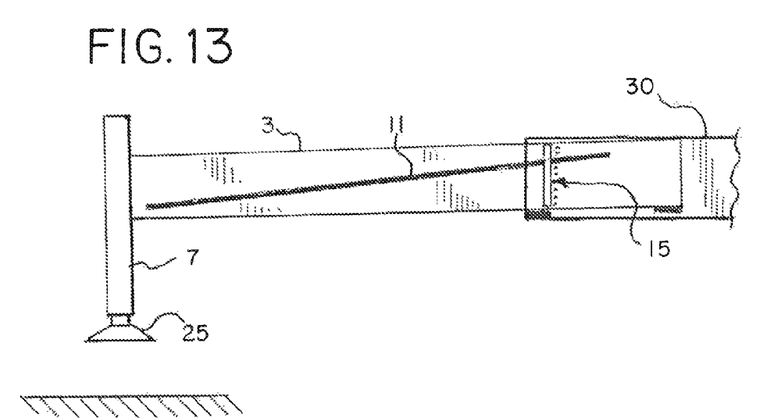
Figure 14:
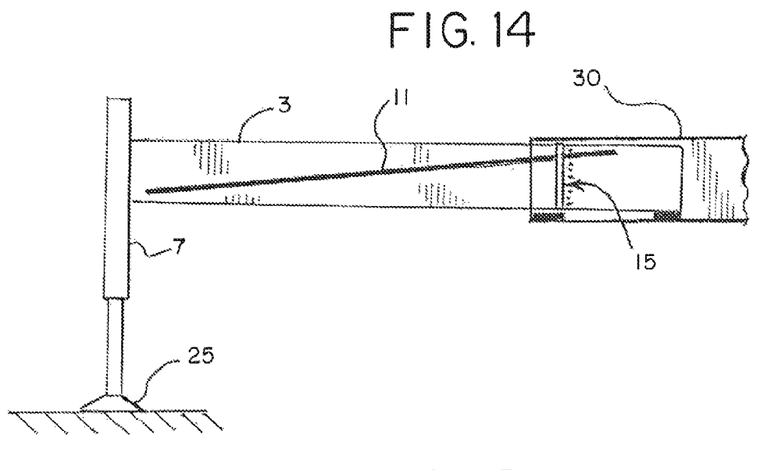

FIGS. 9-14 show how measurements might be taken by the system of the preferred embodiment as the outrigger beam and jack are used in various positions, from a fully retracted position of the outrigger beam (FIGS. 9-10), to a partially extended position of the beam (FIGS. 11-12), and in a fully extended position of the outrigger beam (FIGS. 13-14).

Figure 9:
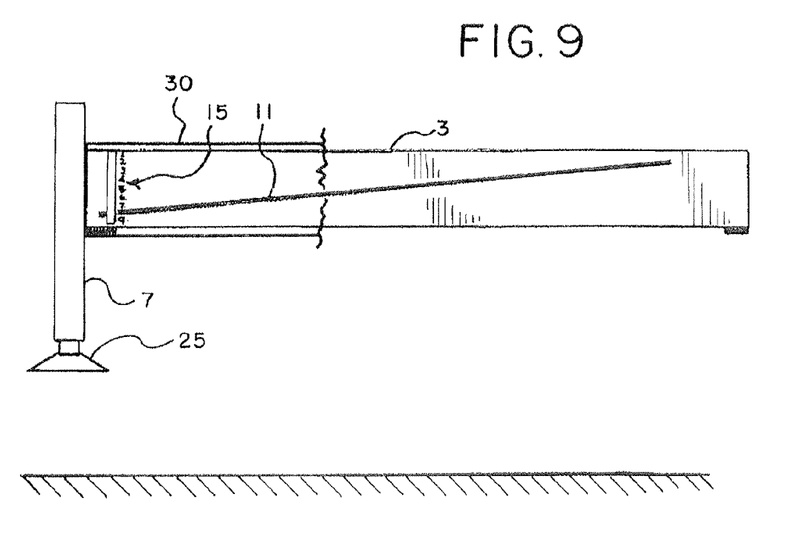
FIGS. 9, 10, 11, 12, 13 and 14 illustrate a system of the invention in use with outriggers in various positions.
Figure 10:
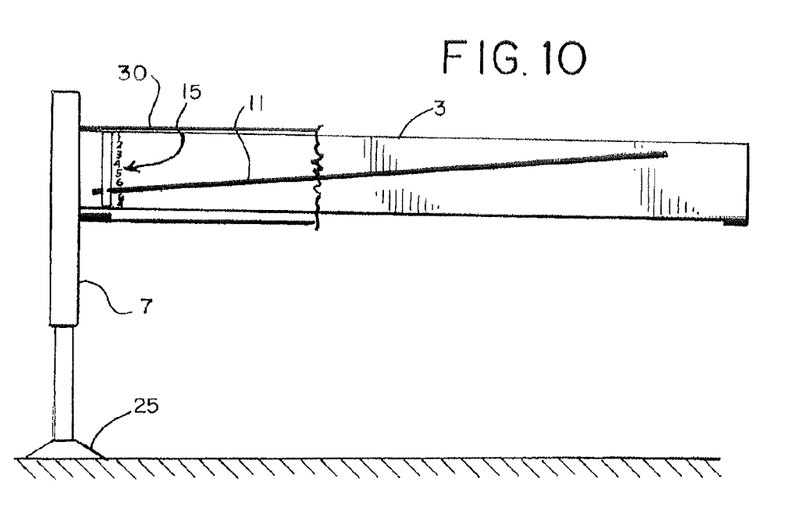
Figures 11, 11A:
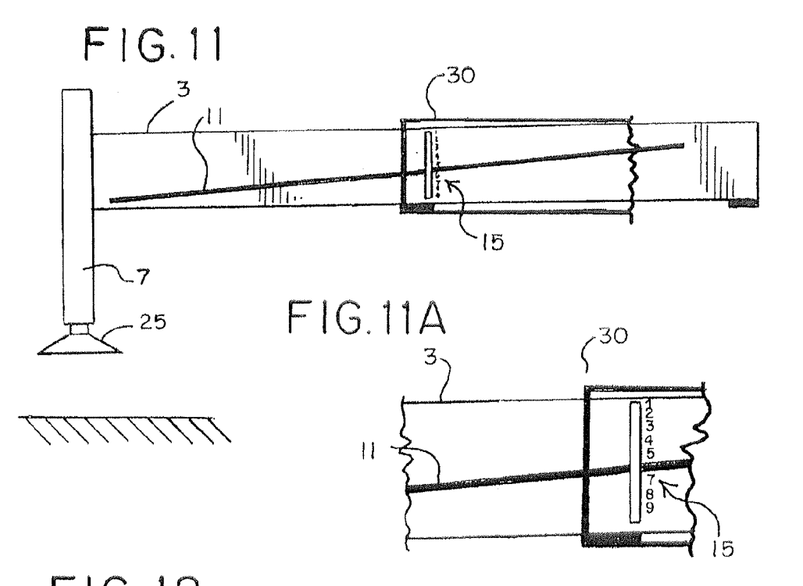
FIGS. 11A and 12A are enlarged views of FIGS. 11 and 12 respectively to show details of a scale that may be used.

In the beam-retracted position in FIGS. 9 and 10, the measurement by the magnetic sensor goes from a reading of 9 (FIG. 9) with the jack in the raised position, to a reading of 8, with the jack in the lowered position (FIG. 10). In the partially extended beam position of FIGS. 11 and 12, the measurement by the magnetic sensor goes from a reading of 6 with the jack in the raised position (FIG. 11A), to a reading of 5, with the jack in the lowered position (FIG. 12A). In the fully extended beam position of FIGS. 13 and 14, the measurement by the magnetic sensor goes from a reading of 3, with the jack in the raised position (FIG. 13), to a reading of 2, with the jack in the lowered position (FIG. 14).

It is to be understood that the above-described numerical readings associated with the sensors, as set forth herein and in the drawing figures, are only for the purpose of illustration, discussion and clarity. The magnetic sensors generate signals indicative of the point at which the magnetic strip crosses the sensor and can provide such signals to a system for monitoring and/or controlling operation of the crane. Visually perceptible indicia of the crossing point of the magnetic strip with the sensor, as illustrated in FIGS. 9-14, can optionally be provided, if desired. The scale of any such indicia is discretionary and is not limited to that described above.

Also, if a series of discontinuous magnetic points are used instead of a continuous strip, as long as one of the points in the series is at the sensor location when the jack is raised or lowered, the movement of the sensed point compared to the sensor will still provide an indication that the jack has been lowered or raised.

Thus, it can be seen that the magnetic sensor arrangement of the present preferred embodiment serves to determine the extent to which the telescoping outrigger beam is extended from the outrigger box, thereby enabling a monitoring/control system of the crane to identify the position of the outrigger jack with respect to the remainder of the crane apparatus. The system of the preferred embodiment also provides signals to detect that the jack has been lowered and to signal that the jack is supporting the crane. This facilitates automatic monitoring of the condition of the crane and appropriate control in response to signals provided by the system of the preferred embodiment.

The invention has been described thus far as comprising a combination including one or more magnetic strips 11, 13 or other series of magnetic points, and one or more magnetic sensors 15, 17. The invention is not limited, however, to use of such components. Other types of sensor arrangements can be utilized in accordance with the invention to accomplish the desired novel results.

Figure 16:
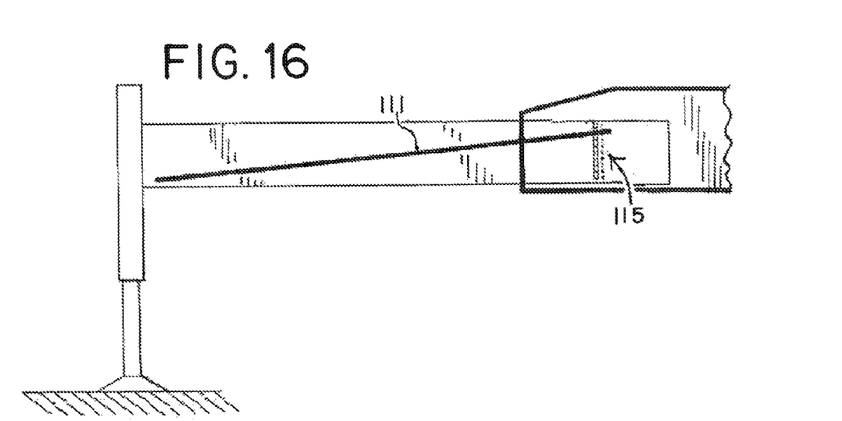
FIGS. 16-20 illustrate other embodiments of the invention.

A sensor containing an array of magnetic switches could be used in place of the above-described magnetic sensor on the outrigger box. The magnetic strip 11, 13 or other form of a series of magnetic points would be used diagonally on the outrigger beam, such as magnetic strip 111 seen in FIG. 16. An array of magnetic switches 115 such as model MG-A2-1.5N from Magnasphere would be appropriate in place of above-described sensors 15, 17.

Figure 17:
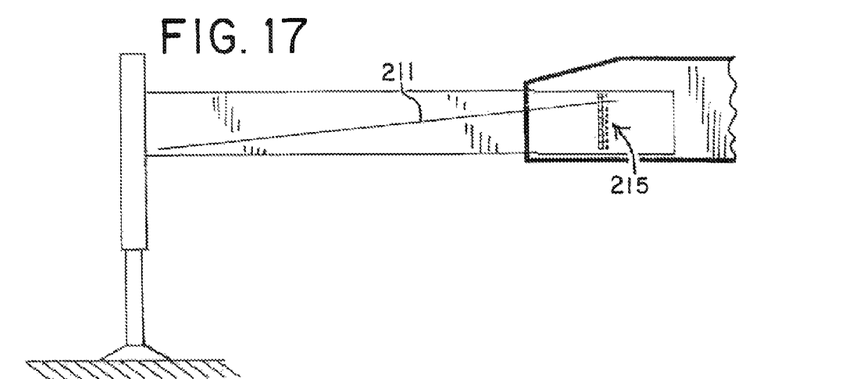

An alternative combination includes a wire carrying a current and a sensor to determine the position of the wire. In such an embodiment (FIG. 17), the series of sensory points would each comprise points along a wire 211 arranged similarly on the outrigger beam. A source of current associated with the wire would cause a current to pass through the wire. In the place of each magnetic sensor 15, 17 the alternate embodiment would include an arrangement of current sensors 215 to determine the position of the current-carrying wire as the beam is extended from or retracted into the outrigger box. An example of a device that could be used to measure the current in a wire running along the beam would be a current sensor model HMC1051Z made by Honeywell. The HMC1051Z is a magnetic/current sensor based on magnetoresistive technology. A vertical array of these sensors could be used to detect the magnetic field caused by a current running through a wire passing near the sensor array.

Figure 18:
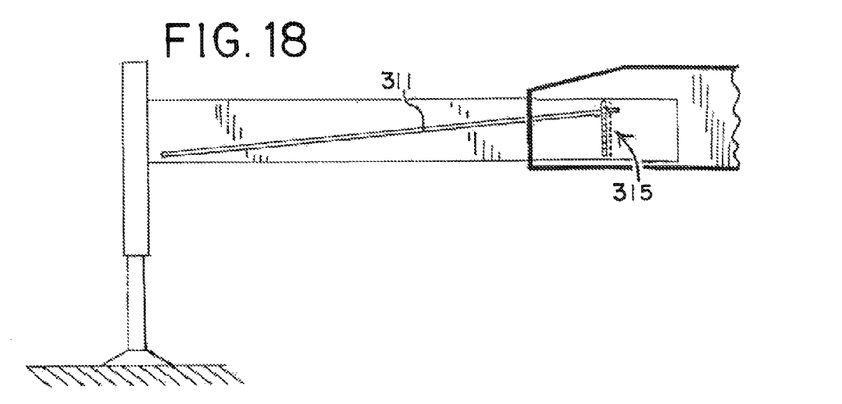

Yet another embodiment of the invention comprises sensors capable of differentiating between ferrous and non-ferrous metals. The outrigger box and the outrigger beam are normally fabricated from steel, a ferrous metal. In the place of each magnetic strip 11, 13, the alternate embodiment (FIG. 18) could comprise an elongated strip of non-ferrous metal 311, or series of non-ferrous metal points, positioned on the outrigger beam on a diagonal, as described above. Each array of sensors 15 and 17 in this embodiment would comprise an array of sensors 315 capable of differentiating between the two types of metals. Inductive Proximity switches with selective detection of ferrous/non-ferrous metals are available from Pepperl+Fuchs GmbH. These proximity switches comprise two separate outputs. One output for signals detection of a ferrous metal and one output signals detection of a non-ferrous metal. With an array of such proximity switches it is possible to differentiate between the ferrous metal of the outrigger beam and the non-ferrous metal strip positioned along the beam, thereby determining the position of the non-ferrous strip and the corresponding position of the beam. Thus, the sensor array could detect the position of the beam and the outrigger with respect to the outrigger box, as described above.

Figure 19:
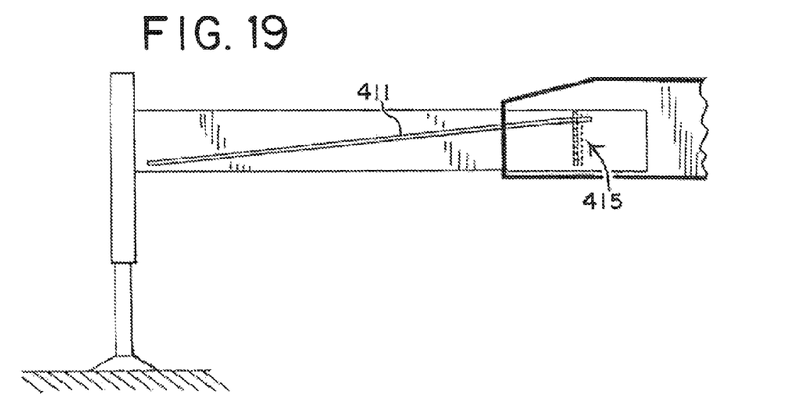

There are two possible ways that optical sensor technology could be utilized in the device of the present alternate embodiment. In a first embodiment (FIG. 19), the invention could comprise, in the position of each sensor 15, 17, an array of reflective photo sensors 415. Each photo sensor comprises an emitter and a receiver in one package. An example of such a device would be the Panasonic CNB1009 (ON2173). These devices would be arranged in a substantially vertical array, as previously described, on the outrigger box. A series of reflective sensory points, or a strip of reflective material 411, would be adhered to the outrigger beam in place of and in the manner of the magnetic strip. The various sensors of the array would have a lower or higher reading depending on the location of the reflective strip with respect to each sensor as the beam is extended from and retracted into the outrigger box, with a higher reading indicating the presence of the reflective strip adjacent one of the sensors. Alternatively, the series of sensory points could comprise a material that absorbs the transmitted radiation. In that case, a sensor in the array would indicate the proximity of the absorptive points with an indication of a lower reading.

Figure 20:
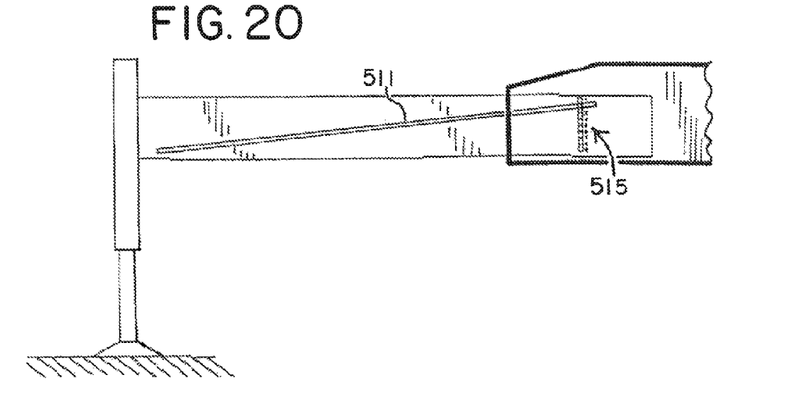

A second option (FIG. 20) for utilizing optical technology in the invention would be to position a series of light points on the outrigger beam in the position of magnetic strip 11, 13. The light points could be of various technologies including LED and fiber optic devices, adhered or otherwise attached to the beam, possibly in strip form 511. In this arrangement, the sensor 15, 17 would comprise an array of photodiodes or photo transistors 515 to sense the presence/proximity of the light source. An example of a photodiode would be the OSRAM SFH203FA. These devices are small and readily available, and could be packaged into an array that could be used to sense the position of the light points as the beam is extended from or retracted into the outrigger box, as discussed above.

It is noted that use of reflective sensory points or of light points on the outrigger beam would also have the additional benefit of providing higher visibility of the extended outriggers.

Control System

As discussed above, signals indicating the length of the outrigger beams and signals indicating that the outrigger jacks are in a lowered position and are supporting the crane may be provided to a controller 56, seen in FIG. 15. The controller may store such information and refer to lookup tables containing correction values for the measurements. That is, in order to perform detection that the inverted jack is supporting the crane for various lengths of extension of the beam, lookup tables can be stored including appropriate data for each outrigger beam (based on the structural characteristics of the beam that effect the manner in which the beam responds to forces during use of the outrigger).

In an exemplary embodiment, two lookup tables are provided for each outrigger beam. A first lookup table stores values related to outrigger beam extension or retraction. A second lookup table stores values related to the position of the jack.

An example of control logic for the control system is provided in the table, shown below. A beam extension or retraction function (Beam Ext) is performed until the beam is moved to a desired position (data is provided for full, 50%, or 0% extension, but other and additional values can be provided as desired). The actual beam extension length, as detected by the sensor, is set and stored. While the jack extend function (Jack Ext) is being performed, the control system continuously monitors the output of the sensor. When the control system detects an expected change in the sensed output, it is determined that the jack is supporting the crane (Jack supporting—yes). Further extension or retraction of the jack does not change the output of the sensor and the status is set such that the jack is supporting the crane. On the other hand, when the output of the sensor changes to an expected value for an unsupported crane, the control system sets the status as that the outrigger and jack are no longer supporting the crane (Jack supporting—no).

| Functioning | Actual beam position | Jack supporting | Sensor | Table |
|---|---|---|---|---|
| Beam Ext | full | no | 3 | 1 |
| Jack Ext | full | no | 3 | 2 |
| Jack Ext | full | yes | 2 | 2 |
| Beam Ext | 50% | no | 6 | 1 |
| Jack Ext | 50% | no | 6 | 2 |
| Jack Ext | 50% | yes | 5 | 2 |
| Beam Ext | 0% | no | 9 | 1 |
| Jack Ext | 0% | no | 9 | 2 |
| Jack Ext | 0% | yes | 8 | 2 |

As long as the outrigger beam is set at a stored length, the operator can operate the jack to change its position. However, the position of the jack is not determined by the controller until the sensor detects a change in position.

Also, if a jack leaks such that it begins to rise, and rises to a level such that it is no longer supporting the crane, the output of the sensor will automatically change to a value that relates to an unsupported crane. A signal of the changed condition can be provided to the operator to indicate this condition and the need to inspect and/or repair the jack.

In a similar manner, if a force such as a load on the crane boom starts to tip the crane, there can be a condition where the outriggers on the non-load side are lifted off of the ground. In such a case, the controller receives signals of the change in status of the lifted jacks (no longer supporting the crane) and can use that information to signal the operator of the condition or to limit the movement of the crane.

Similarly, the controller may monitor the respective jacks and continually determine the location of the load with respect to the crane—that is, on which side the load is at any point in time. Based on this information about the location of the load, the controller may continually evaluate the suitability of the extended positions of the respective outrigger jacks or the magnitude of the load for the ongoing lifting operation. In these various ways the controller continuously monitors the output signal of the sensor to determine whether the crane has shifted during operation.

The above disclosed embodiments reference positions of the outrigger beam of retracted (0%), fully extended (100%), and partially extended (50%). However, the present invention is not limited to these three extension lengths. The measuring system of the present preferred embodiment is capable of monitoring all lengths of beam extension.

As mentioned above, the changes in magnetic readings or other sensor readings in the system of the preferred embodiment will provide an indication that the outrigger jacks are contacting the ground and supporting the crane. The change in reading as discussed above may not confirm conclusively, however, whether the jacks support the crane in such manner that the wheels/tires are entirely elevated off of the ground or if the wheels may still be contacting the ground even though the jacks are supporting the crane. Consistent with use of the present preferred embodiment, other means may be used to detect, when the outriggers are down, whether the wheels/tires are still supporting any part of the weight of the crane or otherwise still in contact with the ground.

A detection method, such as an ABS sensor, may be used to determine if the wheels/tires turn when a small amount of torque is applied. If the wheels/tires turn, then the tires are off of the ground. Also, the controller determines that the brakes are not applied when the wheel turn check begins.

Alternatively, multiple detection devices may be used to sense the distance from a known point on the frame or chassis of the crane to the ground. If the sensed distance is greater than that of what it would be if the wheels/tires were on the ground, then the wheels/tires are off of the ground.

As a further alternative, a length measurement device may be used in the suspension struts or airbags associated with the wheel suspension to determine if the wheels/tires are suspended in the air.

Also, it will be appreciated that the process of determining whether the jacks are supporting the crane will be used without the beam extension detection aspect of the invention. In that case the crane will still have at least one outrigger with a jack mounted thereon. As with the outrigger length measuring system, the outrigger comprises a beam that is moveable along an axis of movement with respect to an outrigger support. The beam has the ability to move up and down a small degree with respect to the support as the weight of the crane is transferred to or from the jack. The system will determine whether the jack is extended and engaging the ground so as to support the crane when the outrigger is in a desired operational position. In this regard, the term "desired operation position" means the outrigger position for which a crane operator wants to know whether the jack is supporting the crane. There may be more than one such position, such as a full beam retraction position, a full beam extension position, and half-way extended position. The system includes at least one sensory point attached to either the beam or the support; and a sensor attached to the other of the beam or the support in a position such that it will be able to sense the position of the at least one sensory point when the outrigger beam is in the desired operational position. The sensor detects the position of the sensory point as the beam moves up or down with respect to the support. A signal indicating whether the jack is providing support for the crane is thus generated. Of course the sensors and magnetic strips of the preferred embodiment of the invention described above with respect to FIGS. 6-14 can be used to provide the at least one sensory point and the sensor.

With the present invention it is possible to automate the safety aspects of a crane control system when setting up a crane at a job site. Instead of an operator manually inputting data on the extent to which the outriggers are extended, the signals from the sensors can provide that input directly. Also, the invention makes it possible to easily have inputs for all intermediate positions of extension, between fully extended and fully retracted.

It should be understood that various changes and modifications to the presently preferred embodiments described herein will be apparent to those skilled in the art. For example, the invention may also be used on a crawler crane if the carbody is equipped with outriggers. Such changes and modifications can be made without departing from the spirit and scope of the present invention and without diminishing its intended advantages. It is therefore intended that such changes and modifications be covered by the appended claims.

What is claimed is:

1. A non-mechanical method for determining a position of a beam with respect to a support for the beam, said beam being moveable along an axis of movement with respect to the support, the method comprising:
   a) attaching a series of sensory points to either the beam or the support in an orientation that is not parallel to the axis of movement;
   b) associating a non-mechanical sensor with the other of the beam or the support in a direction that crosses the series of sensory points at different positions during movement of the beam along said axis;
   c) detecting with said non-mechanical sensor the position of said series of sensory points as the beam moves along said axis; and
   d) providing a first signal from said sensor indicating the relative position of the beam with respect to the support as detected by the non-mechanical sensor and providing a second signal from said sensor to indicate a relative change in position of said beam with respect to said support as a result of a force acting on said beam in a direction that crosses said axis of movement.

2. A crane comprising at least one outrigger comprising a beam that is moveable along an axis of movement with respect to an outrigger support and a jack mounted on said beam, said jack being selectively extensible into contact with a supporting surface to provide support for said crane and the beam having the ability to move up and down a small degree with respect to the support as the weight of the crane is transferred to or from the jack; and a non-mechanical system including a controller for determining a degree of extension of the outrigger and determining whether the jack is extended and engaging the ground so as to support the crane when the outrigger is in a desired operational position; the system comprising:
   a) a series of sensory points attached to either the beam or the support in an orientation that is not parallel to the axis of movement; and
   b) a non-mechanical sensor attached to the other of the beam or the support in a direction that crosses the series of sensory points at different positions during movement of the beam along said axis;
   c) said non-mechanical sensor detecting the position of said series of sensory points as the beam moves along said axis;
   d) said non-mechanical sensor providing a first signal to said controller indicating the relative position of the beam with respect to the support as detected by the sensor and a second signal indicating that said jack has engaged the supporting surface and is supporting the crane.

3. The crane of claim 2 wherein said second signal is provided subsequent to said first signal and subsequent to said jack being extended into contact with the supporting surface, said second signal indicating a relative change in position of said beam with respect to said support as a result of a force imposed on the beam by the jack in a direction crossing said axis of movement.

4. The crane of claim 2 comprising multiple outriggers for selectively supporting said crane, wherein each outrigger comprises a beam that is moveable along an axis of movement with respect to an outrigger support and includes a series of sensory points attached to either the beam or the support in an orientation that is not parallel to the axis of movement; and a non-mechanical sensor attached to the other of the beam or the support in a direction that crosses the series of sensory points at different positions during movement of the beam along said axis.

5. The crane of claim 2 wherein the series of sensory points extend along a diagonal on a surface of the beam and said non-mechanical sensor is attached to the support, is linear and is generally perpendicular to the axis of movement of the beam.

6. The crane of claim 2 wherein when the controller detects an expected change in the output of the linear position indicated by a difference between the first and the second signals, the controller determines that the jack is supporting the crane.

7. The crane of claim 6 wherein the controller continuously monitors an output signal of said non-mechanical sensor to determine whether the crane has shifted during operation.

8. The crane of claim 2 wherein said series of sensory points comprise a magnetic strip and said non-mechanical sensor is a magnetic sensor.

9. The crane of claim 2 wherein said series of sensory point comprises a magnetic strip and said non-mechanical sensor comprises an array of magnetic switches.

10. The crane of claim 2 wherein said series of sensory points comprise a wire carrying an electrical current, and said non-mechanical sensor comprises an array of devices for sensing said current.

11. The crane of claim 2 wherein said beam is comprised of a ferrous metal, said series of sensory points comprise non-ferrous metal, and said non-mechanical sensor comprises an array of devices for differentiating between ferrous and non-ferrous metals.

12. The crane of claim 2 wherein said series of sensory points comprise a material that is selected from a group consisting of optically reflective materials, optically absorptive materials and combinations thereof, and said non-mechanical sensor comprises an array of optical sensors.

13. The crane of claim 2 wherein said series of sensory points comprise an elongated light-emitting element, and said non-mechanical sensor comprises an array of optical sensors.

14. A method of operating a crane comprising a controller, at least one outrigger comprising a beam that is moveable along an axis of movement with respect to an outrigger support and a jack mounted on said beam, said jack being selectively extensible into contact with a supporting surface to provide support for said crane, the method comprising:
  a) providing a series of sensory points attached to either the beam or the support in an orientation that is not parallel to the axis of movement;
  b) providing a non-mechanical sensor attached to the other of the beam or the support in a direction that crosses the series of sensory points at different positions during movement of the beam along said axis;
  c) detecting the position of said series of sensory points with respect to the non-mechanical sensor as the beam moves along said axis;
  d) providing a first signal from said sensor to said controller indicating the relative position of the beam with respect to the support as detected by the non-mechanical sensor; and
  e) lowering said jack into engagement with a supporting surface and providing a second signal from said sensor to said controller indicating that said jack has engaged the supporting surface and is supporting the crane.

15. The method of claim 14 wherein said second signal indicates a relative change in position of said beam with respect to said support as a result of a force imposed on the beam by the jack in a direction crossing said axis of movement.

16. The method of claim 14 further comprising providing said signals to a controller for said crane and detecting a change in the output of the position indicated by a difference between the first and the second signals, to thereby determine that the jack is supporting the crane.

17. A crane comprising at least one outrigger having a jack and a non-mechanical system including a controller for determining a degree of extension of the outrigger with respect to the crane and an engagement status of the jack, the outrigger comprising a beam that is moveable along an axis of movement with respect to an outrigger support, the system comprising:
  a) a series of sensory points attached to either the beam or the support in an orientation that is not parallel to the axis of movement; and
  b) a non-mechanical sensor attached to the other of the beam or the support in a direction that crosses the series of non-mechanical sensory points at different positions during movement of the beam along said axis;
  c) said non-mechanical sensor detecting the position of said series of sensory points as the beam moves along said axis;
  d) said non-mechanical sensor providing a first signal to the controller indicating the relative position of the beam with respect to the support as detected by the non-mechanical sensor and a second signal to the controller indicating an engagement status of the jack.

* * * * *